(12) United States Patent
Ogden et al.

(10) Patent No.: US 12,215,662 B2
(45) Date of Patent: Feb. 4, 2025

(54) TWO-BODY VARIABLE GEOMETRY WAVE ENERGY CONVERTER

(71) Applicant: Alliance for Sustainable Energy, LLC, Golden, CO (US)

(72) Inventors: David Ogden, Golden, CO (US); Nathan Michael Tom, Boulder, CO (US); Jennifer Van Rij, Louisville, CO (US); Yi Guo, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 18/685,380

(22) PCT Filed: Aug. 26, 2022

(86) PCT No.: PCT/US2022/041630
§ 371 (c)(1),
(2) Date: Feb. 21, 2024

(87) PCT Pub. No.: WO2023/034132
PCT Pub. Date: Mar. 9, 2023

(65) Prior Publication Data
US 2024/0344495 A1   Oct. 17, 2024

Related U.S. Application Data

(60) Provisional application No. 63/239,070, filed on Aug. 31, 2021.

(51) Int. Cl.
*F03B 13/10* (2006.01)
*F03B 13/14* (2006.01)
(Continued)

(52) U.S. Cl.
CPC .............. *F03B 13/10* (2013.01); *F03B 13/14* (2013.01); *F03B 13/18* (2013.01); *F03B 13/20* (2013.01); *F03B 15/02* (2013.01)

(58) Field of Classification Search
CPC .......... F03B 13/10; F03B 13/14; F03B 13/18; F03B 13/20; F03B 15/02
See application file for complete search history.

(56) References Cited

U.S. PATENT DOCUMENTS 3,988,592 A * 10/1976 Porter ..................... F03D 9/007
                                                   415/7
6,392,314 B1 * 5/2002 Dick ..................... F03B 13/148
                                                   60/507
(Continued)

FOREIGN PATENT DOCUMENTS

DE   10 2009 054 059 A1   5/2011
JP      2014-105603 A     6/2014

OTHER PUBLICATIONS

International Search Report and Written Opinion for International (PCT) application No. PCT/US22/41630, Date of Mailing Dec. 13, 2022, pp. 1-10.

(Continued)

*Primary Examiner* — Matthew T Largi
(74) *Attorney, Agent, or Firm* — Alexandra M. Hall

(57) ABSTRACT

A two-body wave energy converter (WEC) that utilizes components in the two bodies having variable geometry is described. The WEC includes a surface control body which includes a first variable geometry component, and a reaction control body, which includes a second variable geometry component. During operating, the two variable geometry components may be substantially inflated to enable the WEC to generate electrical energy using power-take off (PTO) components or substantially deflated to allow for load shedding or protection from intense elements.

12 Claims, 5 Drawing Sheets

(51) Int. Cl.
*F03B 13/18* (2006.01)
*F03B 13/20* (2006.01)
*F03B 15/02* (2006.01)

(56) References Cited

U.S. PATENT DOCUMENTS

| | | | |
|---|---|---|---|
| 7,878,734 B2 | 2/2011 | Bull et al. | |
| 8,308,449 B2* | 11/2012 | Smith | F03B 13/187 |
| | | | 417/337 |
| 8,314,506 B2 | 11/2012 | Rhinefrank et al. | |
| 9,059,605 B2* | 6/2015 | Murray | F03B 13/1885 |
| 10,066,595 B2 | 9/2018 | Thresher et al. | |
| 10,400,741 B2* | 9/2019 | Gregory | F03B 13/188 |
| 2005/0123353 A1* | 6/2005 | Dick | F03B 13/20 |
| | | | 405/75 |
| 2008/0106101 A1 | 5/2008 | North et al. | |
| 2009/0202303 A1* | 8/2009 | Jean | F03B 13/188 |
| | | | 405/76 |
| 2009/0309366 A1* | 12/2009 | Moore | B63B 35/44 |
| | | | 114/230.1 |
| 2010/0064679 A1* | 3/2010 | Straume | F03B 13/1885 |
| | | | 60/507 |
| 2011/0012358 A1* | 1/2011 | Brewster | F03B 13/20 |
| | | | 310/11 |
| 2011/0037266 A1* | 2/2011 | Wille | F03B 13/14 |
| | | | 290/53 |
| 2011/0089696 A1* | 4/2011 | Davis | F03B 13/1865 |
| | | | 290/53 |
| 2011/0113771 A1* | 5/2011 | Foster | F03B 13/189 |
| | | | 60/501 |
| 2016/0003214 A1 | 1/2016 | Mundon et al. | |
| 2017/0089318 A1 | 3/2017 | Aldosari | |

OTHER PUBLICATIONS

International Preliminary Report on Patentability for International (PCT) application No. PCT/US22/41630, Date of Issuance Mar. 5, 2024, pp. 1-9.
"Products—PB3 PowerBuoy", PB3 PowerBuoy®—Ocean Power Technologies, available at https://oceanpowertechnologies.com/pb3-powerbuoy/, accessed on Aug. 30, 2021, pp. 1-9.
"Triton WEC", Technology—Oscilla Power, available at https://www.oscillapower.com/tritonwec, accessed on Aug. 30, 2021, pp. 1-5.
"Triton WEC", Technology—Oscilla Power, available at https://oscillapower.com/technology/, accessed on Apr. 10, 2024, pp. 1-5.
"WaveSub—Marine Power Systems", available at https://www.marinepowersystems.co.uk/wavesub/, accessed on Aug. 30, 2021, pp. 1-7.
Beatty et al., "Experimental and numerical comparisons of self-reacting point absorber wave energy converters in regular waves," Ocean Engineering, 2015 vol. 104, pp. 370-386.
Dickens, "Quoceant's Innovative Inflatable Hull Technology Hits the Wave Tank", Quoceant Innovation Offshore, available at https://www.quoceant.com/post/2016/07/21/quoceants-inflatable-hull-technology-innovation-hits-the-wave-tank, Jul. 21, 2016, pp. 1-3.
Greaves et al., "The hydrodynamics of air-filled bags for wave energy conversion," Proceedings of the International Conference on Offshore Renewable Energy, Glasgow, Scotland, Sep. 12-14, 2016, pp. 1-9.
Liang et al., "On The Dynamics and Design of a Two-body Wave Energy Converter", Journal of Physics: Conference Series, 2016, vol. 744, 012074, pp. 1-15.
Neary et al., "Methodology for Design and Economic Analysis of Marine Energy Conversion (MEC) Technologies", Sandia Report, SAND2014-9040, Mar. 2014, pp. 1-262.
Tom et al., "Development of a nearshore oscillating surge wave energy converter with variable geometry", Renewable Energy, 2016, vol. 96, pp. 410-424.
Tom et al., "VGWEC3 Project Report—External Report on the Variable Geometry WEC (VGWEC) Two Body Point Absorber Design", Sep. 30, 2020, pp. 1-38.
Tom et al., "Fatigue and Structural Load Analysis and Control for Variable Geometry WECS (VGWECs)", FY22 External Advisory Panel Webinar, pp. 1-47.
Zou et al., "Modeling of a Variable-Geometry Wave Energy Converter", IEEE Journal of Oceanic Engineering, Jul. 2021, vol. 46, No. 3, pp. 879-890.

* cited by examiner

TWO-BODY VARIABLE GEOMETRY WAVE ENERGY CONVERTER

CROSS-REFERENCE TO RELATED APPLICATIONS

This application claims the benefit of U.S. Provisional Application No. 63/239,070 filed on Aug. 31, 2021, the contents of which are incorporated herein by reference in their entirety.

CONTRACTUAL ORIGIN

This invention was made with United States government support under Contract No. DE-AC36-08GO28308 awarded by the U.S. Department of Energy. The United States government has certain rights in this invention.

BACKGROUND

The design of wave energy converters (WECs) is very important in both the cost of production and efficiency of energy generation. Roughly 35%-50% of the price of wave energy can be attributed to the structural costs of WECs, as they must be designed to withstand large wave loads (i.e., large wave forces or significant wave action). Reducing the structural cost of the WEC and increasing energy capture efficiency are two paths toward reducing wave energy's levelized cost of energy. Most WECs are based upon rigid body dynamics. Ocean wave energy is harvested by rigid bodies and then transmuted into a central electric generator (or other singular power take-off (PTO) system). As a result, rigid WECs are typically only designed for, and optimized towards, a small subset of ocean wave environments, thereby limiting their ability to harvest all sources of wave energy at any given moment. Additionally, due to the centric nature of a rigid-body WEC's electric generator or PTO system, any failures with the generator itself, or with its corresponding rigid bodies, means the converter will literally be "dead in the water" (i.e., not fulfilling its purpose and likely wasting significant sums of money due to needed maintenance and down time). Therefore, there exists a need for a WEC that can withstand large wave loads with reduced structural costs.

SUMMARY

In one aspect, a device for converting wave action to electrical energy, the device including a first body including a first rigid body and a first variable geometry component, a second body including a second rigid body and a second variable geometry component, and a tether including a power takeoff component and connecting the first rigid body to the second rigid body, in which the device has a first position and a second position, the first position includes the first variable geometry component having a first volume, and the second variable geometry component having a second volume, the second position includes the first variable geometry component having a third volume, and the second variable geometry component having a fourth volume, the first volume is greater than the third volume, the second volume is greater than the fourth volume, and force on at least one of the first body or the second body from wave action when the device is in the first position results in the power takeoff component generating electrical energy. In some embodiments, the first rigid body also includes a side and an end, the first variable geometry component is in contact with the side, and the first variable geometry component is configured to contain a gas. In some embodiments, the first variable geometry component includes a first valve configured to allow a release of the gas from the first volume and the third volume when the device transitions from the first position to the second position. In some embodiments, the first valve is configured to allow an inflow of the gas from the third volume to the first volume when the device transitions from the second position to the first position. In some embodiments, the second rigid body includes a plate having an edge, and the plate is substantially circular. In some embodiments, the second variable geometry component is in contact with the edge, and the second variable geometry component is configured to contain a liquid. In some embodiments, the second variable geometry component includes a second valve configured to allow a release of the liquid from the second volume to the fourth volume when the device transitions from the first position to the second position. In some embodiments, the second valve is configured to allow an inflow of the liquid from the fourth volume to the second volume when the device transitions from the second position to the first position.

In a second aspect, a method of operating a device for converting wave action to electrical energy, the method including operating the device in a first position, and transitioning the device to a second position, in which the device includes a first body including a first rigid body and a first variable geometry component, a second body including a second rigid body and a second variable geometry component, and a tether including a power takeoff component and connecting the first rigid body to the second rigid body, the first position includes the first variable geometry component having a first volume, and the second variable geometry component having a second volume, the second position includes the first variable geometry component having a third volume, and the second variable geometry component having a fourth volume, the first volume is greater than the third volume, and the second volume is greater than the fourth volume. In some embodiments, the operating includes receiving a force on at least one of the first body or the second body from wave action, resulting in the power takeoff component generating electrical energy. In some embodiments, the first variable geometry component includes a first valve and contains a gas, the second variable geometry component includes a second valve and contains a liquid, and the transitioning includes releasing the gas through the first valve, resulting in a change from the first volume to the third volume, and releasing the liquid through the second valve, resulting in a change from the second volume to the fourth volume. In some embodiments, the method also includes maintaining the device in the second position. In some embodiments, the first variable geometry component includes a first valve and contains a gas, the second variable geometry component includes a second valve and contains a liquid, and the maintaining includes preventing an inflow or release of the gas through the first valve, resulting in little to no change in volume of the first variable geometry component, and preventing an inflow or release of the liquid through the second valve, resulting in little to no change in volume of the second variable geometry component. In some embodiments, the method also includes transitioning the device from the second position to the first position. In some embodiments, the first variable geometry component includes a first valve and contains a gas, the second variable geometry component includes a second valve and contains a liquid, and the transitioning includes allowing an inflow of the gas through the first valve, resulting in a change from the third volume to the first volume, and allowing an inflow of the liquid through the second valve, resulting in a change from the fourth volume to the second volume.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

REFERENCE NUMERALS

Figure 1A:
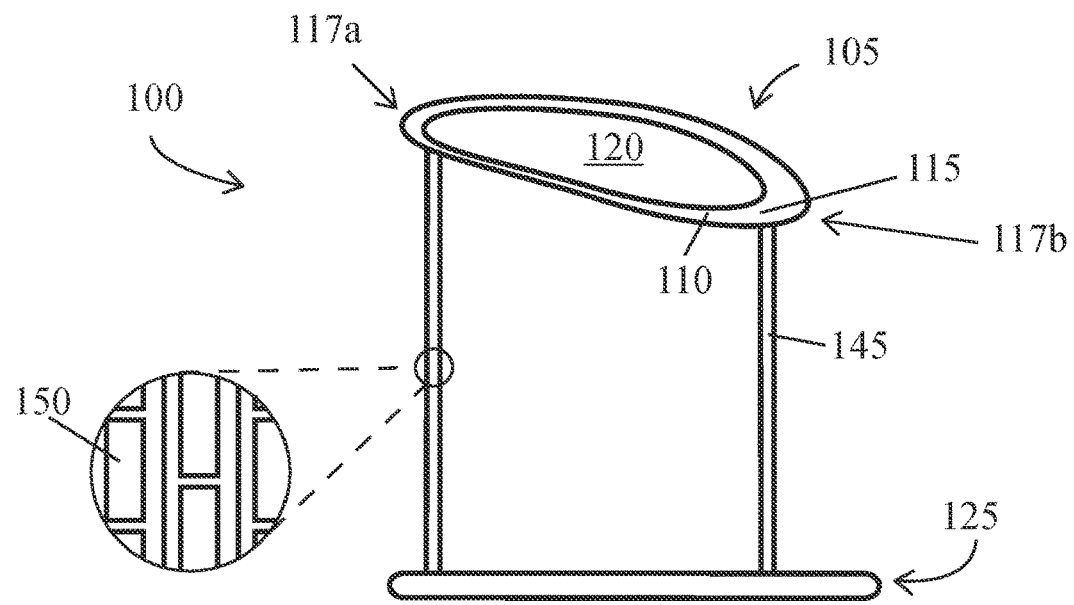
FIG. 1A illustrates a side view.

100 . . . two-body variable geometry wave energy converter (WEC)
105 . . . first body
110 . . . first rigid body
115 . . . side
117 . . . end
120 . . . first variable geometry component
125 . . . second body
130 . . . second rigid body
135 . . . edge
140 . . . second variable geometry component
145 . . . tether
150 . . . power take off component
155 . . . first valve
160 . . . second valve
200 . . . method
205 . . . operating
210 . . . transitioning (first)
215 . . . transitioning (second)
220 . . . repeating

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

As used herein, the terms "power take-off," "power takeoff," and PTO are interchangeable and refer to a method of taking power from a power source and transmitting it into an application. Power take-off may allow a host's energy source (i.e., an engine or motor) to transmit power (either electrical or mechanical power) to a separate component or piece of equipment that does not have its own power source. Power take-off may be done using hydraulic, pneumatic, and/or mechanical applications. Additionally, as used herein, "power take-off," "power takeoff," and PTO may describe a mechanism in which the absorbed energy of the primary converter is converted (or transformed) into useable electricity (i.e., where mechanical energy is converted to electrical energy).

Among other things, the present disclosure relates to a two-body wave energy converter (WEC) that utilizes components in the two bodies having variable geometry. The WEC includes a surface control body which includes a first variable geometry component, and a reaction control body, which includes a second variable geometry component. During operating, the two variable geometry components may be substantially inflated (i.e., filled or substantially filled with at least one of a liquid or gas resulting in an increase in the overall geometry of the WEC device) to enable the WEC to generate electrical energy using power-take off (PTO) components or substantially deflated (i.e., emptied or substantially emptied of a liquid or gas resulting in a decrease in the overall geometry of the WEC device) to allow for load shedding or protection of the WEC from intense elements. The first body may be connected to the second body using a plurality of tethers connected to and/or made from PTO components.

Figure 1B:
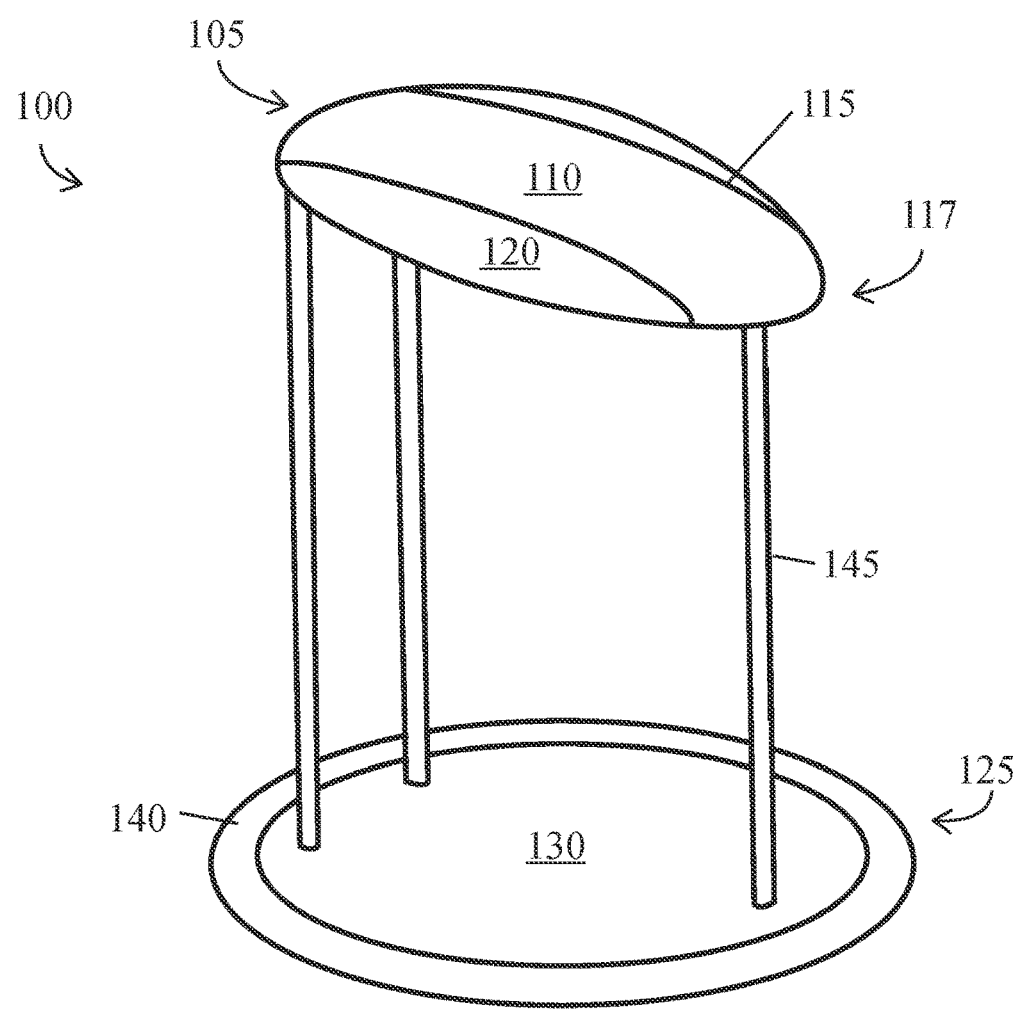
FIG. 1B illustrates a first isometric view.
Figure 1C:
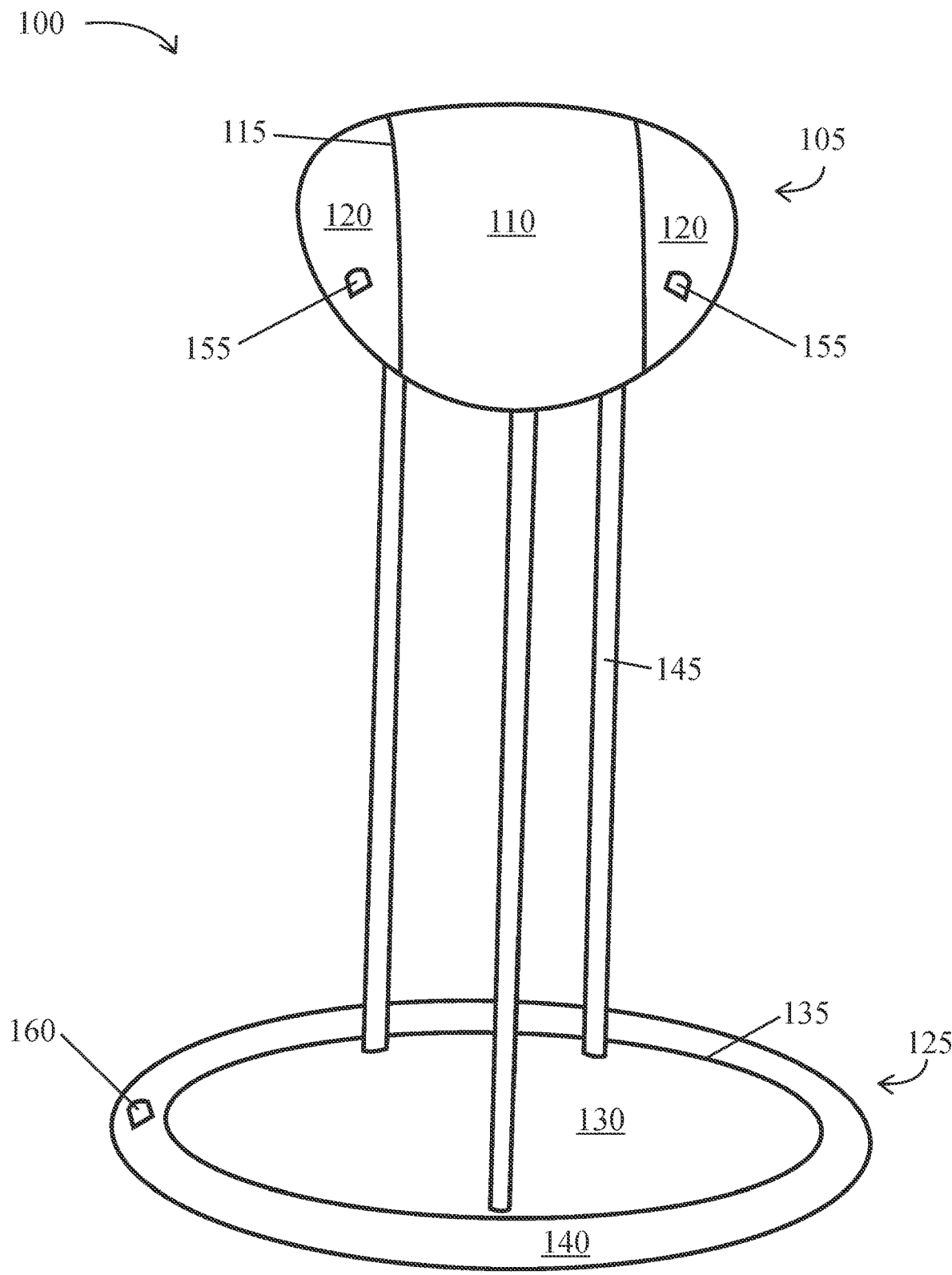
FIG. 1C illustrates a second isometric view of a two-body variable geometry wave energy converter (WEC), according to some aspects of the present disclosure.

FIG. 1A illustrates a side view, FIG. 1B illustrates a first isometric view, and FIG. 1C illustrates a second isometric view of a two-body variable geometry wave energy converter (WEC) 100, according to some aspects of the present disclosure. The two-body variable geometry WEC 100 includes a first body 105 and a second body 125 connected by a tether 145. The tether 145 may include at least one power takeoff (PTO) component 150 and may be stretched, pulled, manipulated, agitated, twisted, and/or moved when the first body 105 and/or the second body 125 receive wave action (i.e., wave energy).

In the examples shown in FIGS. 1A-C, the first body 105 includes a first rigid body 110 which has at least one side 115 and at least one first variable geometry component 120. The first variable geometry component 120 may be in contact with the side 115. The example shown in FIGS. 1A-B shows a first rigid body 110 having two sides 115 and two first variable geometry components 120, but other configurations having more or less sides 115 and/or first variable geometry components 120 may be used. The second body 125 may include a second rigid body 130 which has at least one edge 135 and at least one second variable geometry component 140. The second variable geometry component 140 may be in contact with the edge 135. The example shown in FIGS. 1A-C shows a second rigid body 130 having one edge 135 and a single second variable geometry component 140, but other configurations having more or less edges 135 and/or second variable geometry components 140 may be used.

In the embodiment shown in FIGS. 1A-C, the two-body variable geometry WEC 100 has three tethers 145 made of PTO components 150, although more or less could be used. The tethers 145 shown in FIGS. 1A-C are in the form of cables (i.e., wires or cords) but springs, rope, chains, or other attachment mechanisms could be used. The first body 105 and the second body 125 may have both substantially solid (i.e., the first rigid body 110 and the second rigid body 130, respectively) and substantially inflatable components (i.e., the first variable geometry components 120 and the second variable geometry component 140, respectively), to create the needed "push and pull" for the PTO components 150 to generate electrical energy from the movement of the ocean waves. In some embodiments, mooring lines could be used to attach the second body 125 and/or the first body 105 to an anchor/base, the ocean floor, or another WEC device. These mooring lines could also include PTO components, similar to the PTO components 150 in the tethers 145.

In some embodiments, the first body 105 may be substantially oval-shaped, meaning the first body 105 may have a length that is greater than its width and have a substantially curved perimeter when the first variable geometry components 120 are inflated. The first rigid body 110 may have a side 115 and an end 117. The first variable geometry component 120 may be in contact with the side 115, but not the end 117. The side 115 may be substantially linear and the end 117 may be substantially curved. The first rigid body 110 may be curved such that the first rigid body 110 may not have a uniform thickness through its length and/or width. For example, as shown in the side view of the two-body variable geometry 100 in FIG. 1A, the first rigid body 110 may have a varying thickness through the length. For example, along the length, the thickness may range from about 1 m to about 5 m.

In some embodiments, the first rigid body 110 may be positioned with the tether 145 at an angle. The angle may be in the range of about 1° and about 45° from the horizontal. In some embodiments, the angle may be approximately 10° form the horizontal. This may be accomplished by the shape of the first rigid body 110 and/or by having more than one tether 145 and the tethers 145 may be different lengths. In some embodiments, as shown in FIG. 1A, the first rigid body 110 may be angled such that a first end 117a is approximately 5 m higher (i.e., away in a vertical distance) from a second end 117b. This may be accomplished by having at least one tether 145 be longer than at least one other tether 145.

In some embodiments, the first rigid body 110 may span the entirety of the length and at least a portion of the width of the first body 105. In some embodiments, the length of the first body 105 (and thus the first rigid body 110 as well) may be in the range of about 50 m to about 0.1 m. In exemplary embodiments of the two-body variable geometry WEC 100, the length of the first body 105 (and thus the first rigid body 110) was approximately 0.97 m for modeling and approximately 29 m for full scale purposes. In some embodiments, the length of the first body 105 (and thus the first rigid body 110) may be about 30 m. In some embodiments, the width of the first body 105 may be in the range of about 40 m to about 0.1 m. In exemplary embodiments of the two-body variable geometry WEC 100, the width of the first body 105 was approximately 0.67 m for modeling and approximately 20 m for full scale purposes. In some embodiments, the width of the first body 105 may be about 20 m. In some embodiments, the width of the first rigid body 110 may be in the range of about 30 m to about 0.1 m. In exemplary embodiments of the two-body variable geometry WEC 100, the width of the first rigid body 110 was approximately 0.37 for modeling and approximately 11 m for full scale purposes. In some embodiments, the width of the first rigid body 110 may be approximately 11 m.

In some embodiments, the first rigid body 110 may be made of plastic (such as polyvinyl chloride, polyurethane, polystyrene, or others), foam, wood, fiberglass, carbon fiber, and/or polycarbonate. The first rigid body 110 may be made of a material that is substantially less dense than water (meaning the first rigid body 110 is substantially buoyant). The end 117 of the first rigid body 110 may be curved like a surfboard, wake board, boogie board, kick board, or other object designed to glide relatively easily through the water. In some embodiments, the first rigid body 110 may be a chamber (or compartment) that contains a gas, such as nitrogen, helium, oxygen, argon, or a combination thereof. In some embodiments, the gas may be air from the ambient.

In some embodiments, the first variable geometry component 120 may be an expandable compartment made of a material. The material may be a fabric coated in a waterproof component, rubber (such as neoprene, latex, and/or others), plastic (such as polyurethane, polyester, polyvinyl chloride, and/or others), and/or another material. In some embodiments, the material may be capable of stretching when inflated/filled or substantially inflated/filled. The material may change its shape based on the identity of the contents (and amount/volume of the contents) in the compartment.

In some embodiments, the second body 125 may be substantially circular. In this embodiment, the second rigid body 130 may also be substantially circular. The second rigid body 130 may be in the shape of a circular plate having an edge 135 that is substantially circular and the second variable geometry component 140 may be shaped like a toroid and be in contact with the edge 135. In some embodiments, the second body 125 may have a diameter in the range of about 0.1 m to about 50 m. In exemplary embodiments, the second body 125 had a diameter of approximately 1.16 m for modeling purposes and approximately 35 m for full scale purposes. In some embodiments, the second rigid body 130 may have a diameter in the range of about 0.1 m to about 50 m. In exemplary embodiments, the second rigid body 130 had a diameter of approximately 1 m for modeling purposes and approximately 30 m for full scale purposes. The second variable geometry component 140 may have a diameter in the range of about 0.1 m to about 15 m. In exemplary embodiments of the two-body variable geometry WEC 100, the diameter of the second variable geometry component 140 was approximately 0.08 m for modeling and approximately 2.34 m for full scale purposes.

In some embodiments, the second rigid body 130 may be made of steel, iron, copper, concrete, cement, and/or rock. The second rigid body 130 may have a uniform thickness across the diameter, or it may have a varying thickness across the diameter. In some embodiments, the second rigid body 130 may be a chamber containing a gas, such as nitrogen, helium, oxygen, argon, or a combination thereof. In some embodiments, the gas may be air from the ambient.

In some embodiments, the second variable geometry component 140 may be an expandable compartment made of a material. The material may be a fabric coated in a water-proof component, rubber (such as neoprene, latex, and/or others), plastic (such as polyurethane, polyester, polyvinyl chloride, and/or others), and/or another material. In some embodiments, the material may be capable of stretching when inflated/filled or substantially inflated/filled. The material may change its shape based on the identity of the contents (and amount/volume of the contents) in the compartment.

Figure 2:
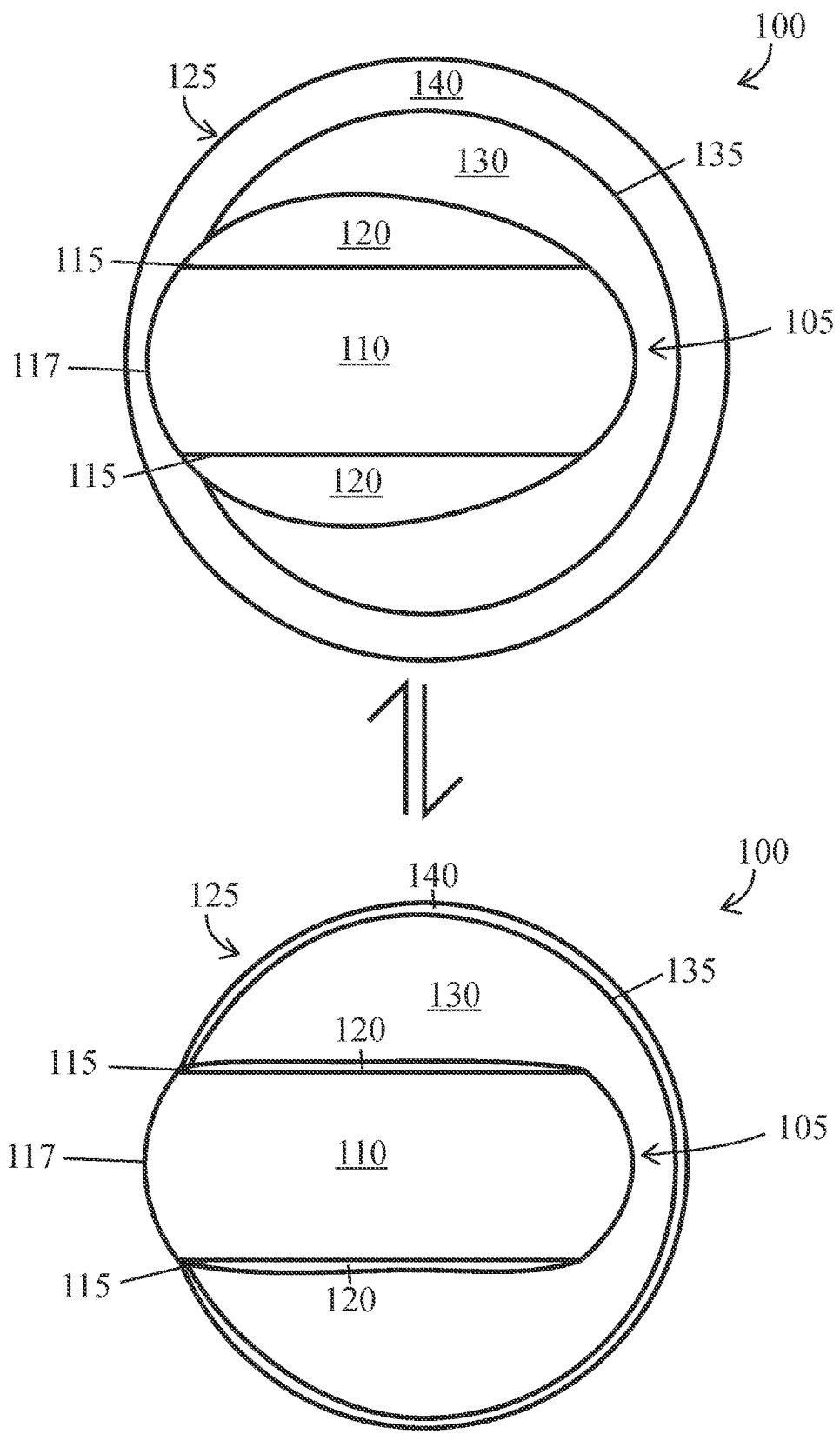
FIG. 2 illustrates a top view of a two-body variable geometry WEC in a first position (top) and a second position (bottom), according to some aspects of the present disclosure.

FIG. 2 illustrates a top view of a two-body variable geometry WEC 100 in a first position (top) and a second position (bottom), according to some aspects of the present disclosure. The two-body variable geometry WEC 100 may be operated in a first position (top of FIG. 2) when generating electrical energy from wave action. The two-body variable geometry WEC 100 may be operated in a second position (bottom of FIG. 2) when not generating electrical energy from wave action (such as, for example, when load shedding is needed due to large and dangerous wave action). The flexibility of being able to transition the two-body variable geometry WEC 100 between the first position and the second position is a significant benefit of the two-body variable geometry WEC 100.

In some embodiments, in the first position (top of FIG. 2) at least one of the first variable geometry components 120 in the first body 105 may have a first volume. The first volume of the first variable geometry components 120 may be achieved by filling, substantially filling, or partially filling the first variable geometry components 120 with a gas. The first geometry components 120 may be expandable compartments capable of changing their volume based on the amount of gas contained in the compartment. Also, in the first position (top of FIG. 2) the second variable geometry component 140 in the second body 125 may have a second volume. The second volume of the second variable geometry component 140 may be achieved by filling, substantially filling, or partially filling the second variable geometry component 140 with a liquid. The second variable geometry component 140 may be an expandable compartment capable of changing its volume based on the amount of liquid contained in the second compartment.

In some embodiments, the second position (bottom of FIG. 2) at least one of the variable geometry components 120 in the first body 105 may have a third volume. The third volume of the first variable geometry components 120 may be achieved by deflating, substantially deflating, or partially deflating the first variable geometry components 120 of a gas. The first volume is greater than the third volume, meaning that the first variable geometry components 120 contain a greater volume of air in the first position than in the second position. Also, in the second position (bottom of FIG. 2) the second variable geometry component 140 in the second body 125 may have a fourth volume. The fourth volume of the second variable geometry component 140 may be achieved by emptying, substantially emptying, or partially emptying the second variable geometry component of a liquid. The second volume is greater than the fourth volume, meaning that the second variable geometry components 140 contain a greater volume of a liquid in the first position than in the second position.

In some embodiments, operating the two-body variable geometry WEC 100 in the first position (top of FIG. 2) may at least somewhat increase the water plane area of the two-body variable geometry WEC 100 when attempting to maximize power extraction. Transitioning the two-body variable geometry WEC 100 to the second position (bottom of FIG. 2) may decrease the water plane area of the two-body variable geometry WEC 100 as the first variable geometry components 120 and/or the second variable geometry components 140 are at least somewhat deflated as the seas get larger to shrink and reduce the hydrodynamic loading. The two-body variable geometry WEC 100 may use the surrounding water to entrain liquid and at least somewhat increase the virtual mass (i.e., material mass plus added mass) of the second variable geometry component 140 for the first body 105 to react against. Compared to traditional WECs, two-body variable geometry WEC 100 utilizes inflatables (i.e., components utilizing variable geometry) rather than a rigid steel core. In some embodiments, the first body 105 and the second body 125 may include concentric rings and/or openings to create additional load shedding capabilities when operated in the second position.

In some embodiments, the two-body variable geometry WEC 100 may provide for the opportunity to maximize the hydrodynamic loads in small-to-moderate sea states to maximize power by operating in the first position (as shown in top of FIG. 2) and deflate in large-to-extreme seas to improve survivability by reducing and streamlining the shape of the two-body variable geometry WEC 100 to reduce hydrodynamic loading when operating in the second position (as shown in the bottom of FIG. 2). The first variable geometry components 120 and/or the second variable geometry components 140 may enable use of easily available (i.e., free) air or water to change or alter the shape and/or buoyancy of the two-body variable geometry WEC 100 (i.e., transition between the first position and the second position).

In some embodiments, the two-body variable geometry WEC 100 may have at least one second body 125 (which acts as a reaction plate), as shown in FIGS. 1A-C and FIG. 2. The second variable geometry component 140 of the second body 125 may contain a liquid (for example, seawater) to provide a reaction mass. By allowing a liquid to enter a second variable geometry component 140, the hydrostatic pressure of the two-body variable geometry WEC 100 may be balanced.

Figure 3:
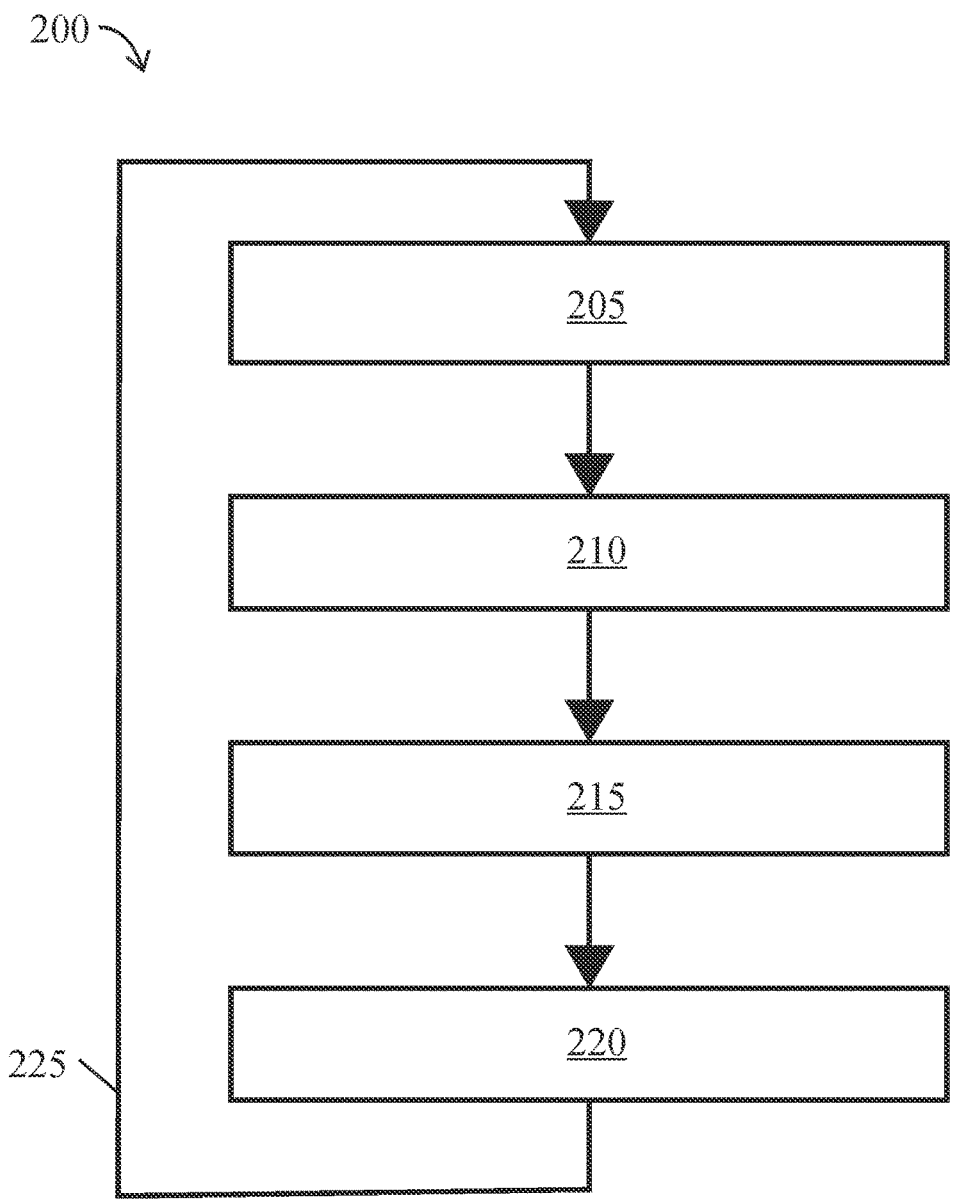
FIG. 3 illustrates a method for utilizing a two-body variable geometry WEC, according to some aspects of the present disclosure.

FIG. 3 illustrates a method 200 for utilizing a two-body variable geometry WEC 100, according to some aspects of the present disclosure. The method 200 includes operating 205 the two-body variable geometry WEC 100 in a first position, and a first transitioning 210 the two-body variable geometry WEC 100 to a second position. In some embodiments, the method 200 also includes maintaining 215 the two-body variable geometry WEC 100 in the second position. In some embodiments, the method 200 also includes a second transitioning 220 the two-body variable geometry WEC 100 from the second position to the first position. In some embodiments, the method may be repeated 225 (i.e., operating 205 after the second transitioning 220).

In some embodiments, the first variable geometry components 120 and/or the second variable geometry component 140 may change size (as measured by internal volume, external surface area, and/or perimeter) and/or shape (as measured by the outline of the perimeter or orientation) as the two-body variable geometry WEC 100 undergoes the first transition 210 between the first position and the second position and the second transition 220 from the second position to the first position.

The first variable geometry components 120 may contain a first volume of a gas when the two-body variable geometry WEC 100 is operating 205 in the first position (i.e., when the two-body variable geometry WEC 100 is generating electrical energy) and may contain a different volume (i.e., a third volume) when the two-body variable geometry WEC 100 is maintained 215 in the second position (i.e., when the two-body variable geometry WEC 100 is not generating electrical energy or is load shedding). A gas may be present in the first variable geometry component 120 when the two-body variable geometry WEC 100 is operated 105 in the first position and the gas may be present in a lesser volume (or even absent) when the two-body variable geometry WEC 100 is maintained 215 in the first variable geometry component 120 in the second position.

In some embodiments, the gas in the first variable geometry component 120 may nitrogen, helium, oxygen, argon, or a combination thereof. In some embodiments, the gas may be air from the ambient. In some embodiments, a first valve 155 may extend through the material of the first variable geometry component 120 to allow the gas (or at least a portion of the gas) to exit the first variable geometry component 120 during the first transition 210 from the first position to the second position. The first valve 155 may also allow the gas to enter (i.e., fill/inflate or substantially fill/inflate) the first variable geometry component 120 during the second transition 220 from the second position to the first position.

The second variable geometry component 140 may contain an initial volume (i.e., a second volume) of a liquid when the two-body variable geometry WEC 100 is operating 205 in the first position and may contain a different volume (i.e., a fourth volume) when the two-body variable geometry WEC 100 is maintained 215 in the second position. A liquid may be present in the second variable geometry component 140 when the two-body variable geometry WEC 100 is operating 205 in the first position and the liquid may be present in a lesser volume (or even absent) with the two-body variable geometry WEC 100 is maintained 215 in the second position.

In some embodiments, the liquid in the second variable geometry component 140 may be water (such as brackish water, salt water, deionized water, and/or filtered water) or another substantially inert liquid. In some embodiments, the liquid may be sea water from the ambient ocean. In some embodiments, a second valve 160 may extend through the material of the second variable geometry component 140 to allow the liquid (or at least a portion of the liquid) to exit the second variable geometry component 140 during the first transition 210 from the first position to the second position. The second valve 160 may also allow the liquid to enter the second variable geometry component 140 during the second transition 220 from the second position to the first position.

The first rigid body 110 and second rigid body 130 (i.e., the reaction plates) may be operated below the wave region in the ocean, and thus the first body 105 and second body 125 may experience less wave loading, improving survivability of the first rigid body 110 and second rigid body 130 (i.e., allowing the first rigid body 110 and/or second rigid body 130 to operate for a relatively long time).

Figure 4:
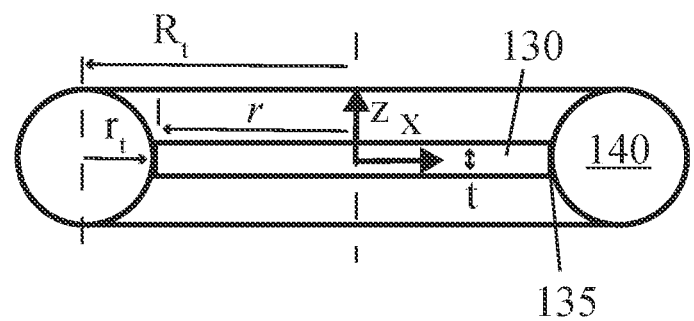
FIG. 4 illustrates a side view (top) and top view (bottom) of a second rigid body in a two-body variable geometry WEC, according to some aspects of the present disclosure.
Figure 4:
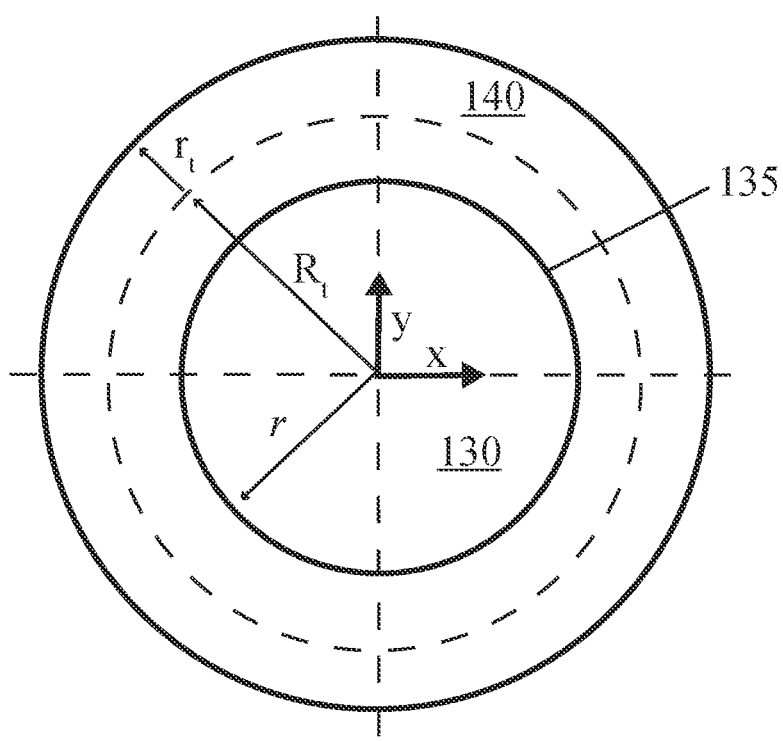

FIG. 4 illustrates a side view (top) and top view (bottom) of a second rigid body in a two-body variable geometry WEC, according to some aspects of the present disclosure. A second rigid body 130 (in the form of a disc or plate) reaction plate design, as shown in FIG. 4, may be defined by the second rigid body 130 radius, r, and thickness, t, allowing for the following mass properties to be calculated:

$$\forall_d = \pi r^2 t$$

$$m_d = \rho_d \forall_d = \rho_d \pi r^2 t$$

$$I_{d44} = I_{d55} = \frac{m_d}{12}(3r^2 + t^2) = \frac{m_d r^2}{4}\left[1 + \frac{1}{3}\left(\frac{t}{r}\right)^2\right] = \frac{\rho_d \pi r^4 t}{4}\left[1 + \frac{1}{3}\left(\frac{t}{r}\right)^2\right]$$

The approximately toroidal ring geometric shape of the second variable geometry component 140, as shown in FIG. 4, may be defined by the major radius, $R_t$, and minor radius, $r_t$, which may allow for the toroidal mass properties to be calculated as follows:

$$\forall_t = \pi r_t^2 2\pi R_t = 2\pi^2 R_t r_t^2$$

$$m_t = \rho_t \forall = \rho_t 2\pi^2 R_t r_t^2$$

$$I_{t44} = I_{t55} = \frac{m}{8}(4R_t^2 + 5r_t^2) = \rho_t \pi^2 r_t^2 R_t^3\left[1 + \frac{5}{4}\left(\frac{r_t}{R_t}\right)^2\right]$$

$$I_{t66} = \frac{m}{4}(4R_t^2 + 3r_t^2) = 2\rho_t \pi^2 r_t^2 R_t^3\left[1 + \frac{3}{4}\left(\frac{r_t}{R_t}\right)^2\right]$$

Now, combining the substantially flat disc of the second rigid body 130 and the toroidal ring of the second variable geometry component 140, as shown in FIG. 4, the aggregate mass and moment of inertia may be calculated as follows:

$$R_t = r + r_t$$

$$m_T = m_d + m_t = \rho_t 2\pi^2 R_t r_t^2 + \rho_d \pi r^2 t = \rho_d \pi r^2 t\left[1 + 2\pi\frac{\rho_t}{\rho_d}\frac{r + r_t}{t}\left(\frac{r_t}{r}\right)^2\right]$$

$$I_{T55} = I_{d55} + I_{t55} = \frac{\rho_d \pi r^4 t}{4}\left[1 + \frac{1}{3}\left(\frac{t}{r}\right)^2\right] + \rho_t \pi^2 r_t^5\left(\frac{r}{r_t} + 1\right)^3\left[1 + \frac{5}{4}\left(\frac{1}{\frac{r}{r_t} + 1}\right)^2\right]$$

Making the following approximation of t<<r, which is appropriate given the dimensions of the first rigid body 110 and second rigid body 130 shown in FIGS. 1A-C, and allows the combined moment of inertia to simplify to the following:

$$I_{T55} \approx \frac{\rho_d \pi r^4 t}{4}\left\{1 + 4\pi\frac{\rho_t}{\rho_d}\frac{r_t}{t}\left(\frac{r_t}{t}\right)^4\left(\frac{r}{r_t} + 1\right)^3\left[1 + \frac{5}{4}\left(\frac{1}{\frac{r}{r_t} + 1}\right)^2\right]\right\}$$

The above simplified equation shows that the leading term is the radium of the relatively think and substantially flat second rigid body 130 and the entire term in the curly bracket is most often greater than one and is highly nonlinear, which implies that any growth in the radius of the substantially flat second rigid body 130 or toroid-shaped second variable geometry component 140 would lead to the moment of inertia increasing quickly. Therefore, adding the entrapped sea water at the ends of the substantially circular reaction body may result in less motion than traditional WECs and may have a positive effect on the ability of a two-body variable geometry WEC 100 to capture power.

In some embodiments, the second body 125 may act as a water inflatable heave plate and the second variable geometry component 140 may use the surrounding seawater to entrain a liquid and increase the mass and volume of the second body 125 for the first body 105 to react against. The inflatable plates and/or edges may increase the water plane area of the float plate when attempting to increase power extraction (i.e., conversion of mechanical wave energy to usable electrical energy) but could be deflated as the seas get larger to shrink and reduce hydrodynamic loading. In some embodiments, rigid steel sections of traditional WECs could be reduced in size, or even eliminated, by the use of inflatable (i.e., variable geometry) materials and components. In some embodiments, the second rigid body 130 (acting as a heave plate) may be made of concentric rings and/or have a plurality of openings (which may be permanently open or may be capable of being filled in or closed when in the first position) to create additional load shedding capabilities.

TABLE 1

Full-scale properties of the unidirectional sea states used to calculate ACCW.

| Sea State | $T_p$ (s) | $H_s$ (m) | Peakedness | Heading (deg) | Spreading $\cos^{2s}$ | Power Flux (kW/m) | Steepness$^{-1}$ ($\lambda_{Tp}/H_s$) |
|---|---|---|---|---|---|---|---|
| 1 | 7.31 | 2.34 | 1 | 10 | inf | 16.7 | 35.6 |
| 2 | 9.86 | 2.64 | 1 | 0 | inf | 29.0 | 57.5 |
| 3 | 11.52 | 5.36 | 1 | −70 | inf | 141.1 | 38.6 |
| 4 | 12.71 | 2.05 | 1 | −10 | inf | 23.1 | 122.4 |
| 5 | 15.23 | 5.84 | 1 | 0 | inf | 233.5 | 60.4 |
| 6 | 16.50 | 3.25 | 1 | 0 | inf | 79.8 | 124.9 |

The structural cost (raw material cost plus cost of fabrication and assembly) is the largest individual contributor to levelized cost of energy (LCOE). For the two-body variable geometry WEC 100, the characteristic capital expenditure (CCE) metric was used to quantify the cost of building the two-body variable geometry WEC 100. The CCE is therefore defined as the cost of the load bearing structure (i.e., the two-body variable geometry WEC 100) and is a first-order cost estimate that is defined as:

$$CCE = \sum_{k=1}^{L} m_k \cdot MMC_k$$

where L denotes the number of key structural materials that compose the two-body variable geometry WEC 100, $m_k$ is the total mass of structural material k, and $MMC_k$ is the manufactured material cost per unit mass of material k.

TABLE 2

Scaling factors used to calculate the net ACCW and the full-scale average annual wave energy flux for each site

| Sea State | Scaling factors for each climate | | | | | | |
|---|---|---|---|---|---|---|---|
| | Alaska | Washington | Northern Oregon | Oregon | Northern California | Southern California | Hawaii |
| 1 | 24.30% | 13.70% | 15.50% | 17.50% | 20.70% | 15.20% | 32.80% |
| 2 | 33.20% | 27.70% | 30.70% | 26.80% | 23.00% | 27.00% | 24.50% |
| 3 | 7.50% | 4.10% | 5.60% | 5.80% | 1.20% | 1.40% | 0.10% |
| 4 | 20.00% | 33.80% | 34.40% | 29.50% | 46.60% | 39.10% | 13.30% |
| 5 | 2.40% | 2.20% | 3.70% | 3.40% | 1.60% | 1.00% | 0.00% |
| 6 | 1.20% | 4.50% | 4.20% | 5.40% | 6.40% | 9.50% | 1.30% |
| $<C_p(j)>$ (kW/m) | 35.5 | 32.7 | 39.3 | 37.9 | 31.5 | 31.2 | 16.8 |

FIG. 1A-C illustrate a two-body variable geometry WEC 100 with no central column and connection between the first rigid body 110 and the second rigid body 130 maintained by power take off (PTO) components 150 in the form of tethers 145, according to some aspects of the present disclosure. To improve the power output of the two-body variable geometry WEC 100, the tether 145 attachment points on the first rigid body 110 were maneuvered to increase the tether's 145 lever arms about the first rigid body's 110 center of gravity. For this process, it was assumed that the first variable geometry component 120 and the second variable geometry component 140 may not be used to attach the tethers 145, they would instead attach to the first rigid body's 110 steel core. The core geometry of the first rigid body 110 was created by scaling the ellipsoid by a factor of 0.5 in the y-direction.

The rear tethers 145 were combined and attached to the first rigid body's 110 lowest point: the relatively flat surface of the first rigid body 110 at this point was determined to be an acceptable attachment point for the tether 145. At this fore, two points on the first rigid body 110 at approximately the waterline were selected. This may be risky to detachment because of the loads experienced in this region of the two-body variable geometry WEC 100, but it does provide large lever arms to help increase power production.

Initially the mass and inertia properties of the first body 105 were derived from the displaced volume. Thus, the first body 105 was assumed to be relatively neutrally buoyant and no pre-tension was required. However, in practice the first rigid body 110 may actually be a hollow "shell" rather than a solid body; hence the mass and inertia properties for the full first rigid body 110 with an approximately 30 mm thickness and made of steel were estimated as follows: mass of approximately 31,552 kg, length in the xx direction of 1,504,502.53 kg m$^2$, length in the yy direction of 7,730, 279.63 kg m$^2$, and length in the zz direction of 8,221,226.23 kg m$^2$. This revision of the first rigid body's 110 mass means the buoyancy force provided by the displaced volume may be much larger than its weight. Hence, in some embodiments, the second rigid body 130 may need to provide a restoring weight and the tethers 145 be pre-tensioned appropriated.

Using the weight of the first rigid body 110 and the buoyancy of the substantially inflated first variable geometry components 120 the required tensions can be solved for as follows:

$$W = mg = 131552 \cdot 9.81 = 1290525.12 \text{ N}$$

$$B = \rho g \nabla = 1000 \cdot 9.81 \cdot 1044.28 = 10244386.8 \text{ N}$$

$$B - W = 8953861.68 \text{ N}$$

$$2T_F + T_A = B - W = 8953861.68$$

$$(9.0 \cdot T_A) + (0.37577 \cdot B) = 2(14.66 \cdot T_F)$$

$$T_F = 1848159.58 \text{ N}$$

$$T_A = 5593167.29 \text{ N}$$

These tensions may be used to determine the attachment points on the second rigid body 130. Assuming the center of gravity of both the first body 105 and the second body 125 are approximately aligned, then by extending a vertical line from the aft attachment point on the first rigid body 110, the aft attachment point on the second rigid body 130 is also at $x_{A,damper}$ which is approximately 9 m. Hence:

$$T_A \cdot x_{A,damper} = 2T_F \cdot x_{F,damper}$$

$$x_{F,damper} = \frac{T_A \cdot x_{A,damper}}{T_F} = \frac{5593167.29 \cdot 9.0}{2 \cdot 1848159.58}$$

$$x_{F,damper} = 13.61 \text{ m}$$

The net buoyancy force on the ellipsoid first body 105 is approximately 8,953,861.68 N. The net weight of the damper (i.e., the second body 125) should approximately balance this out.

In analyzing the two-body variable geometry WEC 100, the wave-excitation pressure, the hydrostatic pressure, the structural weight, and the tether 145 connection between the first rigid body 110 and the second rigid body 130 was considered. In exemplary embodiments, the two-body variable geometry WEC 100 may have an average annual power output in the range of about 150 KW to about 500 kW. In some exemplary embodiments, the two-body variable geometry WEC 100 had an average annual power output of approximately 300 kW.

Device Examples

Example 1. A device for converting wave action to electrical energy, the device comprising:
 a first body comprising a first rigid body and a first variable geometry component;
 a second body comprising a second rigid body and a second variable geometry component; and
 a tether comprising a power takeoff component and connecting the first rigid body to the second rigid body;
 wherein:
 the device has a first position and a second position,
 the first position comprises:
  the first variable geometry component having a first volume, and
  the second variable geometry component having a second volume,
 the second position comprises:
  the first variable geometry component having a third volume, and
  the second variable geometry component having a fourth volume,
 the first volume is greater than the third volume,
 the second volume is greater than the fourth volume, and
 force on at least one of the first body or the second body from wave action when the device is in the first position results in the power takeoff component generating electrical energy.
Example 2. The device of Example 1, wherein:
 the first body has a length and a width, and
 the first body is substantially oval-shaped.
Example 3. The device of Example 2, wherein:
 the first rigid body spans the length of the first body, and
 the first rigid body spans a portion of the width of the first body.
Example 4. The device of Example 2, wherein:
 the length is in the range of about 50 m to about 0.1 m.
Example 5. The device of Example 4, wherein:
 the length is about 30 m.
Example 6. The device of Example 2, wherein:
 the width is in the range of about 40 m to about 0.1 m.
Example 7. The device of Example 6, wherein:
 the width is about 20 m.

Example 8. The device of Example 1, wherein:
the first rigid body comprises at least one of a plastic, a foam, a wood, a fiberglass, a carbon fiber, a polyvinyl chloride, or a polycarbonate.
Example 9. The device of Example 1, wherein:
the first rigid body further comprises a side and an end.
Example 10. The device of Example 1, wherein:
the side is substantially linear, and
the end is substantially curved.
Example 11. The device of Example 9, wherein:
the first variable geometry component is in contact with the side, and
the first variable geometry component is configured to contain a gas.
Example 12. The device of Example 11, wherein:
the gas comprises at least one of nitrogen, helium, oxygen, or argon.
Example 13. The device of Example 11, wherein:
the first variable geometry component comprises a fabric coated in a water-proofing component.
Example 14. The device of Example 11, wherein:
the first variable geometry component comprises rubber.
Example 15. The device of Example 11, wherein:
the first variable geometry component comprises a first valve configured to allow a release of the gas from the first volume and the third volume when the device transitions from the first position to the second position.
Example 16. The device of Example 15, wherein:
the first valve is configured to allow an inflow of the gas from the third volume to the first volume when the device transitions from the second position to the first position.
Example 17. The device of Example 1, wherein:
the second body is substantially circular having a diameter.
Example 18. The device of Example 17, wherein:
the diameter is in the range of about 50 m to about 0.1 m.
Example 19. The device of Example 18, wherein:
the diameter is about 35 m.
Example 20. The device of Example 17, wherein:
the second rigid body comprises a plate having an edge, and
the plate is substantially circular.
Example 21. The device of Example 20, wherein:
the plate comprises at least one of steel or concrete.
Example 22. The device of Example 20, wherein:
the second variable geometry component is in contact with the edge, and
the second variable geometry component is configured to contain a liquid.
Example 23. The device of Example 22, wherein:
the liquid comprises at least one of water, brackish water, salt water, or deionized water.
Example 24. The device of Example 22, wherein:
the second variable geometry component comprises a second valve configured to allow a release of the liquid from the second volume to the fourth volume when the device transitions from the first position to the second position.
Example 25. The device of Example 24, wherein:
the second valve is configured to allow an inflow of the liquid from the fourth volume to the second volume when the device transitions from the second position to the first position.
Example 26. The device of Example 1, wherein:
the first variable geometry component further comprises a power-takeoff component, and
force on the first variable geometry component from wave action results in the power takeoff component generating electrical energy.
Example 27. The device of Example 26, wherein:
the first variable geometry component comprises a material, and
the at least power takeoff component is embedded within the material.
Example 28. The device of Example 27, wherein:
the material comprises a fabric coated in a water-proofing component.
Example 29. The device of Example 1, wherein:
the second variable geometry component further comprises a power-takeoff component, and
force on the second variable geometry component from wave action results in the power takeoff component generating electrical energy.
Example 30. The device of Example 29, wherein:
the second variable geometry component comprises a material, and
the at least power takeoff component is embedded within the material.
Example 31. The device of Example 30, wherein:
the material comprises a fabric coated in a water-proofing component.

Method Examples

Example 1. A method of operating a device for converting wave action to electrical energy, the method comprising:
operating the device in a first position; and
transitioning the device to a second position; wherein:
the device comprises:
a first body comprising a first rigid body and a first variable geometry component;
a second body comprising a second rigid body and a second variable geometry component; and
a tether comprising a power takeoff component and connecting the first rigid body to the second rigid body;
the first position comprises:
the first variable geometry component having a first volume, and
the second variable geometry component having a second volume,
the second position comprises:
the first variable geometry component having a third volume, and
the second variable geometry component having a fourth volume,
the first volume is greater than the third volume, and
the second volume is greater than the fourth volume.
Example 2. The method of Example 1, wherein:
the operating comprises receiving a force on at least one of the first body or the second body from wave action, resulting in the power takeoff component generating electrical energy.
Example 3. The method of Example 1, wherein;
the first variable geometry component comprises a first valve and contains a gas,
the second variable geometry component comprises a second valve and contains a liquid, and
the transitioning comprises:
releasing the gas through the first valve, resulting in a change from the first volume to the third volume, and
releasing the liquid through the second valve, resulting in a change from the second volume to the fourth volume.

Example 4. The method of Example 1, further comprising:
maintaining the device in the second position.
Example 5. The method of Example 4, wherein:
the first variable geometry component comprises a first valve and contains a gas,
the second variable geometry component comprises a second valve and contains a liquid, and
the maintaining comprises:
preventing an inflow or release of the gas through the first valve, resulting in little to no change in volume of the first variable geometry component, and
preventing an inflow or release of the liquid through the second valve, resulting in little to no change in volume of the second variable geometry component.
Example 6. The method of Example 1, further comprising:
transitioning the device from the second position to the first position.
Example 7. The method of Example 6, wherein:
the first variable geometry component comprises a first valve and contains a gas,
the second variable geometry component comprises a second valve and contains a liquid, and
the transitioning comprises:
allowing an inflow of the gas through the first valve, resulting in a change from the third volume to the first volume, and
allowing an inflow of the liquid through the second valve, resulting in a change from the fourth volume to the second volume.
Example 8. The method of Example 1, wherein:
the first body has a length and a width, and
the first body is substantially oval-shaped.
Example 9. The method of Example 8, wherein:
the first rigid body spans the length of the first body, and
the first rigid body spans a portion of the width of the first body.
Example 10. The method of Example 8, wherein:
the length is in the range of about 50 m to about 0.1 m.
Example 11. The method of Example 10, wherein:
the length is about 30 m.
Example 12. The method of Example 8, wherein:
the width is in the range of about 40 m to about 0.1 m.
Example 13. The method of Example 12, wherein:
the width is about 20 m.
Example 14. The method of Example 1, wherein:
the first rigid body comprises at least one of a plastic, a foam, a wood, a fiberglass, a carbon fiber, a polyvinyl chloride, or a polycarbonate.
Example 15. The method of Example 1, wherein:
the first rigid body further comprises a side and an end.
Example 16. The method of Example 15, wherein:
the side is substantially linear, and
the end is substantially curved.
Example 17. The method of Example 15, wherein:
the first variable geometry component is in contact with the side, and
the first variable geometry component is configured to contain a gas.
Example 18. The method of Example 17, wherein:
the gas comprises at least one of nitrogen, helium, oxygen, or argon.
Example 19. The method of Example 17, wherein:
the first variable geometry component comprises a fabric coated in a water-proof component.

Example 20. The method of Example 17, wherein:
the first variable geometry component comprises rubber.
Example 21. The method of Example 17, wherein:
the first variable geometry component comprises a first valve configured to allow a release of the gas from the first volume and the third volume when the device transitions from the first position to the second position.
Example 22. The method of Example 21, wherein:
the first valve is configured to allow an inflow of the gas from the third volume to the first volume when the device transitions from the second position to the first position.
Example 23. The method of Example 1, wherein:
the second body is substantially circular having a diameter.
Example 24. The method of Example 23, wherein:
the diameter is in the range of about 50 m to about 0.1 m.
Example 25. The method of Example 24, wherein:
the diameter is about 35 m.
Example 26. The method of Example 21, wherein:
the second rigid body comprises a plate having an edge, and
the plate is substantially circular.
Example 27. The method of Example 26, wherein:
the plate comprises at least one of steel or concrete.
Example 28. The method of Example 26, wherein:
the second variable geometry component is in contact with the edge, and
the second variable geometry component is configured to contain a liquid.
Example 29. The method of Example 28, wherein:
the liquid comprises at least one of water, brackish water, salt water, or deionized water.
Example 30. The method of Example 28, wherein:
the second variable geometry component comprises a second valve configured to allow a release of the liquid from the second volume to the fourth volume when the device transitions from the first position to the second position.
Example 31. The method of Example 30, wherein:
the second valve is configured to allow an inflow of the liquid from the fourth volume to the second volume when the device transitions from the second position to the first position.
Example 32. The method of Example 1, wherein:
the first variable geometry component further comprises a power-takeoff component, and
force on the first variable geometry component from wave action results in the power takeoff component generating electrical energy.
Example 33. The method of Example 32, wherein:
the first variable geometry component comprises a material, and
the at least power takeoff component is embedded within the material.
Example 34. The method of Example 33, wherein:
the material comprises a fabric coated in a water-proofing component.
Example 35. The method of Example 1, wherein:
the second variable geometry component further comprises a power-takeoff component, and
force on the second variable geometry component from wave action results in the power takeoff component generating electrical energy.
Example 36. The method of Example 35, wherein:
the second variable geometry component comprises a material, and the at least power takeoff component is embedded within the material.

Example 37. The method of Example 36, wherein:
the material comprises a fabric coated in a water-proofing component.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A device for converting wave action to electrical energy, the device comprising:
   a first body comprising a first rigid body and a first variable geometry component;
   a second body comprising a second rigid body and a second variable geometry component; and
   a tether comprising a power takeoff component and connecting the first rigid body to the second rigid body; wherein:
   the second rigid body comprises a plate having an edge,
   the plate is substantially circular,
   the second variable geometry component is in contact with the edge and is configured to contain a liquid,
   the device has a first position and a second position,
   the first position comprises:
      the first variable geometry component having a first volume, and
      the second variable geometry component having a second volume,
   the second position comprises:
      the first variable geometry component having a third volume, and
      the second variable geometry component having a fourth volume,
   the first volume is greater than the third volume,
   the second volume is greater than the fourth volume, and
   force on at least one of the first body or the second body from wave action when the device is in the first position results in the power takeoff component generating electrical energy.

2. The device of claim 1, wherein:
the first rigid body further comprises a side and an end,
the first variable geometry component is in contact with the side, and
the first variable geometry component is configured to contain a gas.

3. The device of claim 2, wherein:
the first variable geometry component comprises a first valve configured to allow a release of the gas from the first volume and the third volume when the device transitions from the first position to the second position.

4. The device of claim 2, wherein:
the first valve is configured to allow an inflow of the gas from the third volume to the first volume when the device transitions from the second position to the first position.

5. The device of claim 1, wherein:
the second variable geometry component comprises a second valve configured to allow a release of the liquid from the second volume to the fourth volume when the device transitions from the first position to the second position.

6. The device of claim 1, wherein:
the second valve is configured to allow an inflow of the liquid from the fourth volume to the second volume when the device transitions from the second position to the first position.

7. A method of operating a device for converting wave action to electrical energy, the method comprising:
operating the device in a first position; and
transitioning the device to a second position; wherein:
the device comprises:
   a first body comprising a first rigid body and a first variable geometry component;
   a second body comprising a second rigid body and a second variable geometry component; and
   a tether comprising a power takeoff component and connecting the first rigid body to the second rigid body;
the first variable geometry component comprises a first valve and contains a gas,
the second variable geometry component comprises a second valve and contains a liquid,
the first position comprises:
   the first variable geometry component having a first volume, and
   the second variable geometry component having a second volume,
the second position comprises:
   the first variable geometry component having a third volume, and
   the second variable geometry component having a fourth volume,
the first volume is greater than the third volume,
the second volume is greater than the fourth volume
the transitioning comprises:
releasing the gas through the first valve, resulting in a change from the first volume to the third volume, and
releasing the liquid through the second valve, resulting in a change from the second volume to the fourth volume.

8. The method of claim 7, wherein:
the operating comprises receiving a force on at least one of the first body or the second body from wave action, resulting in the power takeoff component generating electrical energy.

9. The method of claim 7, further comprising:
maintaining the device in the second position.

10. The method of claim 9, wherein:
the first variable geometry component comprises a first valve and contains a gas, the second variable geometry component comprises a second valve and contains a liquid, and the maintaining comprises:

preventing an inflow or release of the gas through the first valve, resulting in little to no change in volume of the first variable geometry component, and preventing an inflow or release of the liquid through the second valve, resulting in little to no change in volume of the second variable geometry component.

11. The method of claim 7, further comprising:

returning the device from the second position to the first position.

12. The method of claim 11, wherein:

the first variable geometry component comprises a first valve and contains a gas, the second variable geometry component comprises a second valve and contains a liquid, and the returning comprises:

allowing an inflow of the gas through the first valve, resulting in a change from the third volume to the first volume, and allowing an inflow of the liquid through the second valve, resulting in a change from the fourth volume to the second volume.

* * * * *